(12) United States Patent
Fachan

(10) Patent No.: US 7,386,675 B2
(45) Date of Patent: Jun. 10, 2008

(54) SYSTEMS AND METHODS FOR USING EXCITEMENT VALUES TO PREDICT FUTURE ACCESS TO RESOURCES

(75) Inventor: Neal T. Fachan, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 285 days.

(21) Appl. No.: 11/256,317

(22) Filed: Oct. 21, 2005

(65) Prior Publication Data

US 2007/0094452 A1    Apr. 26, 2007

(51) Int. Cl.
| | |
|---|---|
| G06F 3/06 | (2006.01) |
| G06F 9/26 | (2006.01) |
| G06F 9/34 | (2006.01) |
| G06F 12/00 | (2006.01) |
| G06F 13/00 | (2006.01) |
| G06F 13/28 | (2006.01) |

(52) U.S. Cl. ................ 711/137; 711/118; 711/213; 711/217; 711/218

(58) Field of Classification Search .................. None
See application file for complete search history.

(56) References Cited

U.S. PATENT DOCUMENTS

| 5,163,131 A | 11/1992 | Row et al. |
|---|---|---|
| 5,258,984 A | 11/1993 | Menon et al. |
| 5,403,639 A | 4/1995 | Belsan et al. |
| 5,548,724 A | 8/1996 | Akizawa et al. |
| 5,596,709 A | 1/1997 | Bond et al. |
| 5,657,439 A | 8/1997 | Jones et al. |
| 5,668,943 A | 9/1997 | Attanasio et al. |
| 5,734,826 A | 3/1998 | Olnowich et al. |
| 5,761,659 A | 6/1998 | Bertoni |
| 5,774,643 A | 6/1998 | Lubbers et al. |
| 5,805,900 A | 9/1998 | Fagen et al. |
| 5,806,065 A | 9/1998 | Lomet |
| 5,822,790 A * | 10/1998 | Mehrotra .................... 711/213 |
| 5,862,312 A | 1/1999 | Mann |
| 5,870,563 A | 2/1999 | Roper et al. |
| 5,884,098 A | 3/1999 | Mason, Jr. |

(Continued)

FOREIGN PATENT DOCUMENTS

EP   0774723   5/1997

(Continued)

OTHER PUBLICATIONS

Nov. 15, 2002 International Search Report PCT/US02/24728.

(Continued)

Primary Examiner—Donald Sparks
Assistant Examiner—Fred W Detschel
(74) Attorney, Agent, or Firm—Knobbe Martens Olson & Bear LLP

(57) ABSTRACT

Systems and methods using an excitement protocol enable prediction of which blocks of a resource to prefetch and store in memory. The system maintains a set of excitement values corresponding to the resource being accessed. The system also maintains a threshold. As blocks of the resource are requested, the system updates the set of excitement values. The system compares the excitement level to the threshold to determine whether to prefetch the corresponding resource block.

6 Claims, 8 Drawing Sheets

U.S. PATENT DOCUMENTS

| | | | |
|---|---|---|---|
| 5,884,303 A | 3/1999 | Brown et al. | |
| 5,933,834 A | 8/1999 | Aichelen | |
| 5,943,690 A | 8/1999 | Dorricott et al. | |
| 5,996,089 A | 11/1999 | Mann | |
| 6,029,168 A | 2/2000 | Frey | |
| 6,038,570 A | 3/2000 | Hitz et al. | |
| 6,055,543 A | 4/2000 | Christensen et al. | |
| 6,070,172 A | 5/2000 | Lowe | |
| 6,081,883 A | 6/2000 | Popelka et al. | |
| 6,138,126 A | 10/2000 | Hitz et al. | |
| 6,154,854 A | 11/2000 | Stallmo | |
| 6,209,059 B1 | 3/2001 | Ofer et al. | |
| 6,219,693 B1 | 4/2001 | Napolitano et al. | |
| 6,321,345 B1 | 11/2001 | Mann | |
| 6,334,168 B1 | 12/2001 | Islam et al. | |
| 6,353,823 B1 | 3/2002 | Kumar | |
| 6,384,626 B2 | 5/2002 | Tsai et al. | |
| 6,385,626 B1 | 5/2002 | Tamer et al. | |
| 6,397,311 B1 | 5/2002 | Capps | |
| 6,449,730 B2 | 9/2002 | Mann | |
| 6,453,389 B1* | 9/2002 | Weinberger et al. | 711/137 |
| 6,457,139 B1 | 9/2002 | D'Errico et al. | |
| 6,502,172 B2 | 12/2002 | Chang | |
| 6,502,174 B1 | 12/2002 | Beardsley et al. | |
| 6,526,478 B1 | 2/2003 | Kirby | |
| 6,546,443 B1 | 4/2003 | Kakivaya et al. | |
| 6,557,114 B2 | 4/2003 | Mann | |
| 6,567,894 B1* | 5/2003 | Hsu et al. | 711/137 |
| 6,567,926 B2 | 5/2003 | Mann | |
| 6,571,349 B1 | 5/2003 | Mann | |
| 6,574,745 B2 | 6/2003 | Mann | |
| 6,594,660 B1 | 7/2003 | Berkowitz et al. | |
| 6,598,174 B1 | 7/2003 | Parks et al. | |
| 6,618,798 B1 | 9/2003 | Burton et al. | |
| 6,848,029 B2* | 1/2005 | Coldewey | 711/137 |
| 6,934,878 B2 | 8/2005 | Massa et al. | |
| 6,940,966 B2 | 9/2005 | Lee | |
| 7,146,524 B2 | 12/2006 | Patel et al. | |
| 2001/0047451 A1 | 11/2001 | Noble et al. | |
| 2002/0124137 A1 | 9/2002 | Ulrich et al. | |
| 2002/0138559 A1 | 9/2002 | Ulrich et al. | |
| 2002/0156840 A1 | 10/2002 | Ulrich et al. | |
| 2002/0156891 A1 | 10/2002 | Ulrich et al. | |
| 2002/0156973 A1 | 10/2002 | Ulrich et al. | |
| 2002/0156974 A1 | 10/2002 | Ulrich et al. | |
| 2002/0156975 A1 | 10/2002 | Ulrich et al. | |
| 2002/0161846 A1 | 10/2002 | Ulrich et al. | |
| 2002/0161850 A1 | 10/2002 | Ulrich et al. | |
| 2002/0161973 A1 | 10/2002 | Ulrich et al. | |
| 2002/0165942 A1 | 11/2002 | Ulrich et al. | |
| 2002/0166026 A1 | 11/2002 | Ulrich et al. | |
| 2002/0166079 A1 | 11/2002 | Ulrich et al. | |
| 2002/0169827 A1 | 11/2002 | Ulrich et al. | |
| 2002/0174295 A1 | 11/2002 | Ulrich et al. | |
| 2002/0174296 A1 | 11/2002 | Ulrich et al. | |
| 2002/0178162 A1 | 11/2002 | Ulrich et al. | |
| 2002/0191311 A1 | 12/2002 | Ulrich et al. | |
| 2002/0194523 A1 | 12/2002 | Ulrich et al. | |
| 2002/0194526 A1 | 12/2002 | Ulrich et al. | |
| 2002/0198864 A1 | 12/2002 | Ostermann et al. | |
| 2003/0014391 A1 | 1/2003 | Evans et al. | |
| 2003/0033308 A1 | 2/2003 | Patel et al. | |
| 2003/0135514 A1 | 7/2003 | Patel et al. | |
| 2003/0172149 A1 | 9/2003 | Edsall et al. | |
| 2004/0003053 A1 | 1/2004 | Williams | |
| 2004/0024963 A1 | 2/2004 | Talagala et al. | |
| 2004/0153479 A1 | 8/2004 | Mikesell et al. | |
| 2004/0199734 A1 | 10/2004 | Rajamani et al. | |
| 2004/0230748 A1* | 11/2004 | Ohba | 711/137 |
| 2005/0114609 A1 | 5/2005 | Shorb | |
| 2006/0004760 A1 | 1/2006 | Clift et al. | |
| 2006/0095438 A1 | 5/2006 | Fachan et al. | |
| 2006/0101062 A1 | 5/2006 | Godman et al. | |
| 2006/0230411 A1 | 10/2006 | Richter et al. | |
| 2006/0277432 A1 | 12/2006 | Patel | |
| 2007/0091790 A1 | 4/2007 | Passey et al. | |
| 2007/0094269 A1 | 4/2007 | Mikesell et al. | |
| 2007/0094277 A1 | 4/2007 | Fachan et al. | |
| 2007/0094310 A1 | 4/2007 | Passey et al. | |
| 2007/0094431 A1 | 4/2007 | Fachan | |
| 2007/0094452 A1 | 4/2007 | Fachan | |
| 2007/0168351 A1 | 7/2007 | Fachan | |
| 2007/0171919 A1 | 7/2007 | Godman et al. | |
| 2007/0195810 A1 | 8/2007 | Fachan | |

FOREIGN PATENT DOCUMENTS

| | | |
|---|---|---|
| WO | WO 02/061737 | 8/2002 |

OTHER PUBLICATIONS

Apr. 20, 2004 International Search Report PCT/US03/36699.

Aug. 6, 2004 International Search Report PCT/US03/33704.

Philip A. Bernstein, Vassos Hadzilacos, and Nathan Goodman, *Concurrency Control and Recovery in Database Systems*, Addison-Wesley, 1987.

Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.

Kenneth P. Birman, *Building Secure and Reliable Network Applications*, Manning, 1996, pp. 1-327.

Kenneth P. Birman, *Building Secure and Reliable Network Applications*, Manning, 1996, pp. 328-620.

Coulouris et al., *Distributed Systems Concepts and Design*, Addison-Wesley, Second Edition, 1994, pp. 353-371 and 377-405.

Jim Gray and Andreas Reuter, *Transaction Processing: Concepts and Techniques*, Morgan Kaufmann, 1993, pp. 1-328.

Jim Gray and Andreas Reuter, *Transaction Processing: Concepts and Techniques*, Morgan Kaufmann, 1993, pp. 329-664.

Jim Gray and Andreas Reuter, *Transaction Processing: Concepts and Techniques*, Morgan Kaufmann, 1993, pp. 665-1105.

Nancy A. Lynch, *Distributed Algorithms*, Morgan Kaufmann, 1996, pp. 1-409.

Nancy A. Lynch, *Distributed Algorithms*, Morgan Kaufmann, 1996, pp. 410-871.

Sape Mullender, editor, *Distributed Systems* (2$^{nd}$ Ed.), ACM Press/Addison-Wesley Publishing Co., New York, NY, USA, 1993, pp. 1-327.

Sape Mullender, editor, *Distributed Systems* (2$^{nd}$ Ed.), ACM Press/Addison-Wesley Publishing Co., New York, NY, USA, 1993, pp. 328-604.

Gibson, Garth A. et al., *The Scotch Parallel Storage System*, IEEE, 1995, pp. 403-410.

Gerhard Weikum, et al., *Transactional Information Systems: Theory, Algorithms, and the Practice of Concurrency Control and Recovery*, Morgan Kaufmann, 2002, pp. 1-450.

Gerhard Weikum, et al., *Transactional Information Systems: Theory, Algorithms, and the Practice of Concurrency Control and Recovery*, Morgan Kaufmann, 2002, pp. 451-863.

Sanjay Ghemawat et al., *The Google File System*, Symposium on Operating Systems Principles, Oct. 19-22, 2003, 15 pages, Bolton Landing, NY.

Pei Cao et al., *The TickerTAIP parallel Raid architecture*, 1993, 12 pages, Princeton, NJ.

Pei Cao et al., *The TickerTAIP parallel Raid architecture*, ACM Transactions on Computer Systems, vol. 12, No. 3, Aug. 1994, 34 pages, Palto Alto, California.

Bob Duzett, et al., *An Overview of the nCube 3 Supercomputer*, IEEE, Jul. 1992, pp. 458-464.

John Henry Hartman, *The Zebra Striped Network File System*, 1994, pp. 1-148, University of California at Berkeley.

Darrell D.E. Long et al., *Swift/Raid: A Distributed Raid System*, Computing Systems, vol. 7, No. 3 Summer 1994, pp. 333-359.

Michael Stonebraker et al., *Distributed Raid: A new Multiple copy Algorithm*, IEEE 1990, pp. 430-437, Berkeley, California.

United States Court of Appeals, Federal Circuit, *Seachange International, Inc.* Vs. *nCUBE, Corp.*, Oct. 26, 2004, 28 pages.

United States Court of Appeals, Federal Circuit, *Seachange International, Inc.* Vs. *C-Cor, Inc.*, Jun. 29, 2005, 22 pages.

United States District Court, Delaware, *Seachange International, Inc.* Vs. *nCUBE, Corp.*, Apr. 7, 2004, 13 pages.

United States District Court, Delaware, *Seachange International, Inc.* Vs. *nCUBE, Corp.*, Aug. 29, 2000, 12 pages.

European Search Report dated May 21, 2007 issued to EP application No. 02756944.1-2201.

Stallings, William, "Operating Systems," Prentice Hall, Fourth Edition, 2001, pp. 197-253 and 265-293.

Steven M. Bauer, Letter to Steve Goldman, Jul. 31, 2006 (including the first pages of the patents).

Arthur S. Rose, Letter to Steven M. Bauer, Aug. 7, 2006.

Steven M. Bauer, Letter to Arthur S. Rose, Sep. 25, 2006.

Steven M. Bauer, Letter to Arthur S. Rose, Oct. 31, 2006.

Arthur S. Rose, Letter to Steven M. Bauer, Nov. 9, 2006.

Steven M. Bauer, Letter to Arthur S. Rose, Feb. 6, 2007.

Arthur S. Rose, Letter to Steven M. Bauer, Feb. 23, 2007.

Steven M. Bauer, Letter to Arthur S. Rose, Jun. 7, 2007 (including claim chart).

Arthur S. Rose, Letter to Steven M. Bauer, Jun. 22, 2007.

Todd A. Gerety, Letter to Arthur S. Rose, Jun. 26, 2007 (including exhibits listed separately).

Isilon Systems, "Isilon IQ Platform Overview", 1-4, 2007 (Exhibit A).

Isilon Systems, "Uncompromising Reliability through Clustered Storage", Sep. 2006, 1-10 (Exhibit B).

Byteandswitch, "Discovery Chooses Isilon," Apr. 23, 2007, 1 (Exhibit C).

Taneja Group Technology Analysts, "The Power of InfiniBand and Clustered Storage", Dec. 2005, 1-8 (Exhibit E).

Arthur S. Rose, Letter to Steven M. Bauer, Aug. 31, 2007.

Ramez Elmasri, Fundamentals of Database Systems 3rd ed., Sep. 30, 1999, Addison-Wesley, pp. 155, 169, 171, 172, 173, 178, 181, 182, 381, 771.

\* cited by examiner

SYSTEMS AND METHODS FOR USING EXCITEMENT VALUES TO PREDICT FUTURE ACCESS TO RESOURCES

REFERENCE TO RELATED APPLICATIONS

The present disclosure relates to U.S. patent application Ser. No. 11/255,817, titled "SYSTEMS AND METHODS FOR DISTRIBUTED SYSTEM SCANNING," U.S. patent application Ser. No. 11/256,410, titled "SYSTEMS AND METHODS FOR PROVIDING VARIABLE PROTECTION," U.S. patent application Ser. No. 11/255,346, titled "SYSTEMS AND METHODS FOR MANAGING CONCURRENT ACCESS REQUESTS TO A SHARED RESOURCE," U.S. patent application Ser. No. 11/255,818, titled "SYSTEMS AND METHODS FOR MAINTAINING DISTRIBUTED DATA," and U.S. patent application Ser. No. 11/255,337 titled "SYSTEMS AND METHODS FOR ACCESSING AND UPDATING DISTRIBUTED DATA," each filed on Oct. 21, 2005 and each hereby incorporated by reference herein in their entirety.

FIELD OF THE INVENTION

The systems and methods of the present invention relate generally to improving access to a set of resources by prefetching resources that have not been requested.

BACKGROUND

The explosive growth of the Internet has ushered in a new era in which information is exchanged and accessed on a constant basis. In response to this growth, there has been an increase in the size of resources that are being shared. Users are demanding more than standard HTML documents, wanting access to a variety of resources, such as, audio data, video data, image data, and programming data. Thus there is a need for resource storage that can accommodate large sets of resources, while at the same time providing fast and reliable access to the resources.

Accessing resource data stored in file systems has historically been a bottleneck for computer systems. Processor speeds, memory sizes, and network speeds have greatly increased, but disk I/O (Input/Output) performance has not increased at the same rate, making disk I/O operations inefficient, especially for large resource files.

One response to this problem has been to prefetch portions of resource files before they are requested and to store them in a cache. Because the cache I/O performance is much better than that of the disk drive, the portions of the resource files stored in the cache can be accessed much faster than if they resided on the disk. Accordingly, disk caching can lead to improvements in file system performance and throughput.

However, this response to the problem raises the question of how to decide which portions of the resource to prefetch. One answer to this question has been to adopt a simple read-ahead protocol in which a prefetch instruction is issued for a fixed number of blocks of data, such as ten or twenty, stored ahead of the block requested by a user or client application.

The simple read-ahead approach suffers from numerous problems. Special code is needed to issue prefetches when reading of a file commences. If reading commences at a new position in the file and then proceeds sequentially, blocks of the file ahead of the new position will not have not been prefetched and will be read slowly. If files are randomly accessed, the system wastes resources by prefetching blocks that will never be used. Finally, the number of blocks prefetched is typically fixed and independent of the read speed of the disk. Therefore, too many blocks are prefetched when the read speed is slow, which wastes cache space, and conversely too few blocks are prefetched when the read speed is high, which degrades performance and throughput.

SUMMARY OF THE INVENTION

The systems and methods discloses herein use excitement values to predict future access to resources. In one embodiment, an excitement system for predicting future accesses to a set of resources comprises a processor configured to access a set of resources and to store a set of excitements and a threshold. The set of resources may comprise one or more resource blocks. The set of excitements may comprise excitement values that correspond to one or more of the resource blocks. The excitement system may receive a request for a resource block and then access the requested resource block. The excitement system may update the set of excitement values such that a change in the excitement values is related to the requested resource block. By comparing the excitement values to the threshold, the excitement system may determine a set of predicted resource blocks. The excitement system may access the set of predicted resource blocks and may return the requested and predicted resource blocks.

In one embodiment, a system for improved access to a set of resources comprises a processor configured to access a set of resources comprising resource blocks. The processor may be configured to maintain a set of excitements comprising excitement values that correspond to a plurality of the resource blocks and to maintain a threshold. The excitement system may receive a request for a resource block and may update the set of excitements, wherein a change in the excitement values is related to the requested resource block. The excitement system may determine a set of predicted resource blocks by comparing the excitement values to the threshold.

In one embodiment, an excitement method of predicting future accesses to a resource comprises accessing a set of resources, which comprise resource blocks. The excitement method further comprises maintaining a set of excitements, which comprise excitement values that correspond to a plurality of the resource blocks. The excitement method further comprises maintaining a threshold. Upon receiving a request for a resource block, the excitement method may provide for accessing the requested resource block. The excitement method comprises updating the set of excitements by, for example, calculating a change in the excitement values that is related to the requested resource block. The updated set of excitement values is used in determining a set of predicted resource blocks by, for example, by comparing the excitement values to the threshold. The excitement method may comprise the steps of accessing the set of predicted resource blocks and returning the requested and predicted resource blocks.

Another embodiment provides an excitement system for improved access to a data file by using an excitement array. The data file is stored in a storage medium. A processor is operably coupled to the storage medium and is configured to maintain the excitement array and to maintain a threshold. The processor may receive a read request for a block of the data file, retrieve the block from the storage medium, and determine a set of predicted blocks by comparing the excitement array to the threshold.

Another embodiment provides an excitement system for improved access to data comprising a storage device configured to store data blocks, a memory configured to store one or more of the data blocks, and a processor operably coupled to the memory and the storage device. The processor may be configured to maintain one or more excitement values corresponding to the data blocks and to maintain a threshold. The excitement system may be configured to receive a location corresponding to a request for a data block stored in the storage device or in the memory and to update the one or more excitement values based on the location of the requested data block. The excitement system may determine a set of predicted data blocks by comparing the one or more excitement values to the threshold; and return a signal corresponding to the set of predicted data blocks to the storage device or the memory.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

DETAILED DESCRIPTION OF PREFERRED EMBODIMENTS

Figure 1:
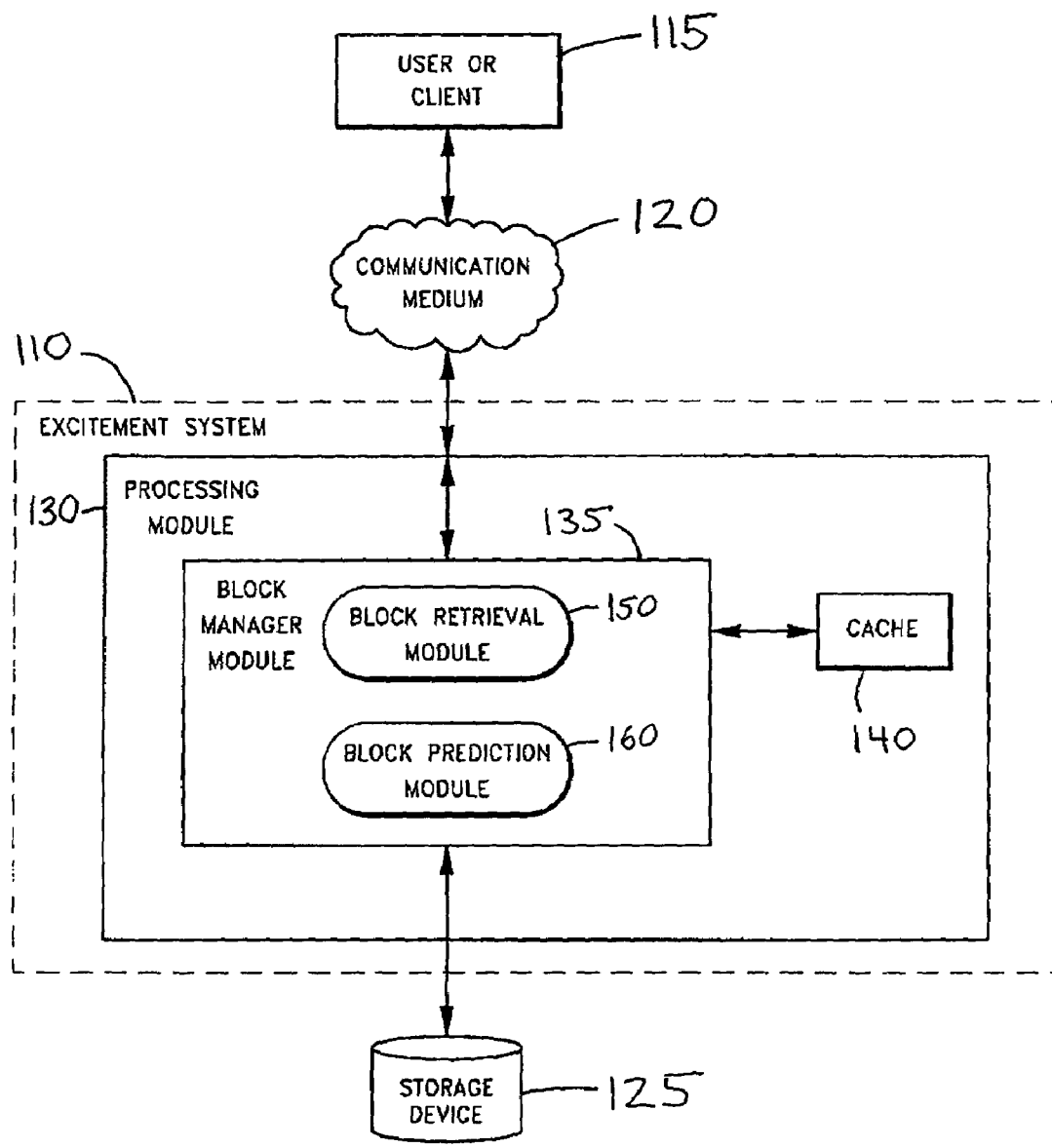
FIG. 1 illustrates a high-level block diagram of an embodiment of a system to predict future access to resources.

Systems and methods that represent one embodiment and example application of the invention will now be described with reference to the drawings. Variations to the systems and methods that represent other embodiments will also be described. The specific embodiments described herein are set forth in order to illustrate, and not to limit, the invention. The scope of the invention is defined by the appended claims and their equivalents.

For purposes of illustration, some embodiments will be described in the context of access to a data file stored on a disk drive. The inventors contemplate that the present invention is not limited by the type of environment in which the systems and methods are used. The systems and methods may be used in other environments and in other contexts, such as, for example, in network file systems, distributed file systems, operating systems, the Internet, and the World Wide Web. The systems and methods may be implemented on, for example, personal computers, workstations, servers, or mainframes, or on other electronic devices such as, for example, cell phones, personal digital assistants, web browsers, or multimedia players. In some embodiments, for clarity of description only, the data file is shown as being stored on a single disk drive. However, the inventors contemplate that resources may be stored on, for example, multiple disks, local and or remote disks, redundant, mirrored, or striped disks, SCSI devices, or RAID disk systems. Additionally, resources may be stored on tapes, floppy disks, cartridges, or optical disks such as CD-ROMs or DVDs. Furthermore, volatile or nonvolatile memory, comprising, for example, DRAM, SRAM, or ROM, can be used to store resources. The inventors further contemplate that the systems and methods disclosed may be utilized for access to the broadest range of resources such as, for example, data files, graphics files, sound or video files, images, databases, metadata, software, programs, or processes. Resources may be utilized in environments such as, for example, computer systems, network systems, storage systems, telecommunications systems, library systems, inventory systems, reservation systems, financial systems, and the like.

These and other features will now be described with reference to the drawings summarized above. The drawings and the associated descriptions are provided to illustrate embodiments of the invention and not to limit the scope of the invention. Throughout the drawings, reference numbers may be re-used to indicate correspondence between referenced elements. In addition, the first digit of each reference number generally indicates the figure in which the element first appears.

I. Overview

As the power of computer processors and the size of system memory have increased, users and client applications have acquired the need to access resources rapidly and efficiently. With the advent of larger and cheaper storage media, the size of the resources has increased as well. Data transfer to and from memory is relatively fast. However, data transfer to and from a storage medium, such as a disk drive, is relatively slow. Similarly, with the increased us of networked systems, the need to request data form remote systems has also increased. Data requests to a local system are typically faster than request from a remote system. A resource manager, such as, for example, a disk controller or device driver, controls the I/O to the storage medium. A resource manager may also or instead control remote data requests. There is a need to increase the performance and efficiency of the resource manager in order to improve the performance and throughput of the processing system, so as to enable users and client applications to rapidly access ever larger resources.

One response to this need has been to implement a "read-ahead" or "prefetch" protocol wherein the resource manager retrieves resources before they have been requested by the user or client application. The prefetched resources are typically stored in memory or in a cache that can be accessed rapidly. If the protocol is correct at predicting which resources will be requested, system performance may be dramatically improved. The read-ahead or prefetching protocol must make decisions regarding when to fetch a resource from the storage medium or remote system, which portion of the resource to fetch, and how long to store the resource in memory or cache.

The excitement systems and methods disclosed herein enable the resource manager to predict which portions of a resource are likely to be accessed in the near future. The resource manager may use this prediction to signal other processing units to queue the appropriate resources for retrieval, or the manager may perform the prefetch operations itself. The excitement systems and methods advantageously allow the resource manager to improve efficiency and throughput.

Within this disclosure, resource is used broadly to mean any form of information including, for example, data files, graphics files, sound or video files, images, databases, metadata, software, programs, instructions, or processes. Resources may be utilized in environments such as, for example, computer systems, network systems, storage systems, telecommunications systems, library systems, inventory systems, reservation systems, financial systems, and the like. Likewise, storage medium is used broadly and includes, for example, local or remote: disk drives, volatile or nonvolatile memory, optical disks, or tapes. In some environments, resources may be stored cryptographically and may require encryption or decryption before or after being accessed.

As illustrated in embodiments disclosed herein, the resource will be described as being stored sequentially as a set of blocks of data. This is for purposes of illustration and clarity of presentation only and is not meant to limit the manner in which a resource may be organized or stored. Depending on the context in which they are used, resources may be organized using data structures such as, for example, arrays, strings, lists, files, objects, fields, records, tables, trees, nodes, hashes, or heaps. Additionally, resources may be organized in the form of, for example, data files, software, programs, instructions, or processes. Resources may be stored sequentially or randomly in the storage medium.

The system and methods using the excitement protocol maintain a set of excitement values that correspond to the resource being accessed. The excitement values may correspond to each block of the resource or may correspond to a subset of the resource blocks. The excitement values may be stored in data structures such as, for example, an array, list, hash, or heap. The system also maintains a threshold that is a level or set of levels used in determining which resource blocks to prefetch. In one embodiment, the excitement values are established the first time a block of the resource is requested. The excitement values are changed when neighboring blocks of the resource are requested. The change in the excitement value corresponding to a resource block may be a function of its offset from the requested resource block and the number of resource blocks that were read. For example, in some embodiments, the change in excitement value increases as the offset decreases in order to reflect the likelihood that resource blocks having smaller offsets from the currently accessed block will be requested before resource blocks having larger offsets.

In some embodiments, the system determines whether to prefetch a resource block by comparing its excitement value to the threshold. The threshold may be tuned to maximize system performance and throughput. In one embodiment, an arithmetic comparison is used such that a resource block is prefetched when its excitement value reaches or exceeds the threshold. In some embodiments, the threshold may comprise a set of levels so as to describe a comparison function having a plurality of parameters.

The excitement system and methods may provide for the excitement values to decay with elapsed time in order to reflect, for example, the possibility that a resource block is less likely to be requested long after it is first excited. A benefit of enabling excitement decay is that system memory need not be allocated to resource blocks whose excitement value has decayed below a minimum value. The rate of decay may be selected to be linear, exponential, or some other type designed to meet the needs of users.

The excitement system and methods provide a protocol to predict which resource blocks to prefetch so as to increase performance and throughput. The excitement protocol may be utilized advantageously in systems in which retrieval of resources from the storage medium takes longer than retrieval from the memory or cache. One benefit of the system and methods is that resource blocks may be prefetched "just-in-time" meaning that the prefetch operation completes, and the blocks are stored in memory or cache just prior to the time they are requested. The system and methods improve memory and cache performance by prefetching blocks that are more likely to be requested while not prefetching those blocks unlikely to be requested. The excitement protocol advantageously enables a processor to keep pace with a user or client application's need to access resources.

An additional benefit of some embodiments is that parameters in the excitement protocol may be selected to maximize processor performance and or throughput. For example, in some embodiments the threshold and the decay rate may be tuned so that the system reduces the number of prefetches if the resource is being accessed randomly. Additionally, in some embodiments, the parameters may be selected so that the system prefetches resources in proportion to the speed at which they can be retrieved so that memory has sufficient resource blocks to supply to the user or client application while not storing resource blocks that are not yet needed.

Another benefit of some embodiments is that system performance may be improved by reducing the memory storage requirements for the excitement protocol. For example, in one embodiment, an excitement value is maintained for only the first byte of each resource block, and the prefetch decision for the entire block is based on this excitement value. In some embodiments, storage for excitement values is allocated only when the resource is first accessed, and storage is released when the excitement values decay to zero.

Another benefit of some embodiments is that the system may optimize performance and throughput by performing real-time modifications to the excitement protocol. For example, excitement parameters such as the threshold and the decay rate may be monitored and adjusted so that read-ahead is in proportion to the current read speed. Additionally, excitement parameters may be adjusted so that data is prefetched "just-in-time" to satisfy demand by users and client applications.

II. Sample Operation

For purposes of illustration, a sample scenario will now be discussed in which the excitement system and methods are used in operation. In the sample scenario, a financial services company offers access to its proprietary database of financial information. The database may contain past performance histories for stocks, bonds, and mutual funds together with models and predictions for future performance. The database may further include information about customers and their portfolio trading histories. The company may permit users to access the database locally, e.g., from within the company, or across a network, such as the Internet or the World Wide Web. The database may be stored on a local, remote, or distributed file system.

Some of the resources in the database may be stored sequentially such as, for example, a large file tracking the long-term performance history of an exchange-traded stock. Other resources may be stored in a more random manner across the file system, such as, for example, a listing of stock trades occasionally made by a particular customer. Multiple copies of some or all of the resources may be stored to ensure that the data may be recovered in the event of a storage medium failure.

The company may utilize the excitement system and methods to improve its users' access to the financial database. For example, a user may request the trading history of a stock, which will be presumed in this example to be a large file sequentially stored in the storage medium. As a result of this request, the storage medium's read mechanism (the "reader") will position itself at the location of the first block of the data file and will initiate the retrieval of the data block. The excitement system will increment the excitement values corresponding to blocks in the neighborhood of the reader by an amount that typically depends on their offset from the block being read. In some embodiments, the increment in excitement is larger for blocks at small offsets from the reader. As the reader continues to retrieve data from the resource file, the excitement values will accumulate in magnitude. If the excitement value reaches the threshold, the excitement system will send an instruction that the block be prefetched and placed in memory. If the excitement value remains below the threshold, the block will not be prefetched.

In this manner, the system will prefetch only those blocks that have become sufficiently "excited." By utilizing the excitement system as described herein, resource blocks may be prefetched "just-in-time" regardless of the read speed of the storage medium. The throughput of the system is improved, because memory is filled with neighboring blocks that are likely to soon be requested.

In another example, a user may request a listing of the stock trades made by the user during a given year. Data corresponding to this request will be presumed to be stored at random locations throughout the storage medium. In this random-access scenario, the excitement system also improves resource access. As described above, the initial request for the data will excite blocks in the neighborhood of the reader. However, their excitement values will not continue to accumulate in magnitude, because the reader soon jumps to a new location in the storage medium. Accordingly, the excitement values for these blocks never reach the threshold, and the system does not waste memory by prefetching resource blocks that will never be requested by the user.

In some embodiments, the system may provide for decay of the excitement values so that the excitement value for blocks not recently accessed will decrease with time. Advantageously, the system may improve efficiency by not allocating memory to track excitement values for resource blocks with sufficiently low excitement values. Excitement decay may provide a benefit in the random access example by causing small excitement values to decay to zero so that such blocks are not prefetched as the reader jumps around in the resource.

While the sample scenario and examples discussed above involve a company offering access to a database, it is recognized that this scenario and these examples are used only to illustrate features of one embodiment of the excitement system. Furthermore, the excitement system and methods may be used in other environments and contexts and with other types of resources, such as, for example, access to sound or video files stored by an entertainment provider or access to program instructions stored by an operating system.

III. Excitement System

FIG. 1 illustrates one embodiment of an excitement system 110. Users or client applications 115 may communicate with the excitement system 110 through a communication medium 120, such as the Internet or a local-area or wide-area network. The communication medium 120 typically supports communications protocols such as TCP/IP and standards for file access such as NFS or CIFS. The communication medium 120 may include an application server that communicates requests to the excitement system 120. In some embodiments, the request is local within a system while in other embodiments, the request is remote via a communication medium 120. Resources to be accessed are stored in a storage device 125. The storage device 125 may be a non-volatile memory device such as a disk drive, an optical drive, or a tape drive. In one embodiment, the storage device 125 is an intelligent distributed file system. Various features of embodiments of an intelligent distributed file system are described in U.S. patent application Ser. No. 10/007,003 filed Nov. 9, 2001, entitled "SYSTEMS AND METHODS FOR PROVIDING A DISTRIBUTED FILE SYSTEM UTILIZING METADATA TO TRACK INFORMATION ABOUT DATA STORED THROUGHOUT THE SYSTEM," which is hereby incorporated by reference herein in its entirety and which claims priority to Application No. 60/309,803 filed Aug. 3, 2001, which is hereby incorporated by reference herein in its entirety. In some embodiments, the storage device 125 may be a volatile memory device such as RAM or ROM.

While FIG. 1 illustrates one embodiment of the excitement system 110, it is recognized that other embodiments may utilize additional devices. For example, application servers including audio or video streaming servers, image processing servers, or database servers may communicate with the excitement system 110. Furthermore, additional devices such as workstations may interact with the excitement system 110. It is also recognized that a variety of resources may be stored on the storage device 125. Such resources include data files, graphics files, sound or video files, images, databases, metadata, software, programs, or processes.

FIG. 1 illustrates an embodiment of the excitement system 110 that is comprised of a processing module 130 that includes a processing module 130, a block manager module 135, and a cache 140. This embodiment of the excitement system 110 may be configured to communicate with the user or client application 115 and with the storage device 125.

As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

A. Processing Module

The example processing module 130 may be configured to receive requests for resources from the communication medium 120 and to receive the resources from the storage device 125. The processing module 130 may send an instruction to signal other devices to perform the resource retrieval or it may be configured to perform the retrieval directly. The processing module 130 may perform management tasks, such as, for example, installation, startup, parameter setting, event logging, and updating. Further, the processing module 130 may monitor excitement system 110 performance and throughput and additionally may update excitement system 110 parameters either from time-to-time, in real-time, or at system load-time.

B. Block Manager Module

The block manager module 135 coordinates access to the resources stored in the storage device 125. The block manager module 135 may locate resource blocks in response to a read request and may allocate resource blocks in response to a write request. The block manager module may 135 implement the policies of a "read-ahead" algorithm in order to determine which of the resource blocks are to be prefetched. Accordingly, the block manager module 135 may send a request for a set of data and also request some amount of data stored ahead of the set of data. By implementing the read-ahead algorithm, the block manager module 135 may improve the throughput of data from the storage device 125 to the user or client application 115. In one embodiment, read-ahead is determined by an excitement algorithm.

Additionally, the block manager module 135 may manage the caching of resource blocks in a cache 140. The block manager module 135 may cache data blocks using a Least Recently Used ("LRU") caching algorithm or some other algorithm, such as frequency caching. The block manager module 135 may determine which block caching algorithm to use depending on which performs the best, or in other embodiments, an algorithm may be set as the default. LRU caching is a common caching scheme used in some embodiments. LRU is based on the principal that once data is accessed it will most likely be accessed again. Thus, data is stored in order of its last usage such that data that has not been accessed for the longest amount of time is discarded. As discussed further herein, the excitement algorithm provides a method to determine which cached blocks should be dropped from the cache ("drop-behind"). Accordingly, the block manager module 135 may use an embodiment of the excitement algorithm to manage drop-behind.

In the embodiment illustrated in FIG. 1, the block manager module 135 includes modules configured to respond to resource requests, to retrieve resource blocks, and to manage prefetching of resource blocks. These modules are a block retrieval module 150 and a block prediction module 160. Although FIG. 1 illustrates two separate modules, it is recognized that other embodiments may combine the functions of these two modules or may utilize more than two modules to manage the tasks of the block manager module 135. Further, it is recognized that the order in which the modules illustrated in FIG. 1 are utilized may depend on the manner in which an embodiment implements the functions of the block manager module 135.

1. Block Retrieval Module

The block retrieval module 150 manages the retrieval of blocks stored on the storage device 125. In one embodiment, the block retrieval module 150 may receive requests for the resource block, which may include the location of the block, and may retrieve the requested resource blocks. The block retrieval module 150 may check whether the requested block is stored in the cache 140, in which case it retrieves the block from the cache 140. If the requested block is not stored in the cache 140, the block retrieval module 150 may send a request for the resource block to the storage device 125 and then receive the block from the storage device 125. The block retrieval module 150 may then return the requested block to the block manager module 135.

The block retrieval module 150 may be configured to interact with both local and remote devices. It is recognized that the term "remote" may include devices, components, and/or modules not stored locally, that is, not accessible via the local bus. Thus, a remote device may include a device which is physically located in the same room and connected via a device such as a switch or a local area network. In other situations, a remote device may also be located in a separate geographic area, such as, for example, in a different location, country, and so forth. In some embodiments, the cache 140 and the storage device 125 may comprise local and/or remote devices or components. The block retrieval module 150 may be configured to retrieve resource blocks from some or all of the local and remote devices.

In some embodiments, the block retrieval module 150 may also be configured to signal the cache 140 when to drop resource blocks which have been previously cached.

2. Block Prediction Module

The exemplary block prediction module 160 implements the policies of the read ahead protocol wherein more resource blocks are requested than required. The block prediction module 160 may utilize the excitement system to predict which blocks to prefetch. The excitement system may base its prediction on device parameters such as, for example, device read speed and device latency. The block prediction module 160 returns the location of blocks to be prefetched in order that the block manager module 135 may signal the block retrieval module 150 to retrieve the appropriate blocks.

C. Cache

The cache 140 may be implemented using a variety of products that are well known in the art, such as, for example, a 1 G RAM cache. The cache 140 illustrated in FIG. 1 may store blocks of resources that have recently been accessed or that have been predicted to be accessed in the future. The cache 140 may be implemented using a high-speed storage mechanism, such as a static RAM device, a dynamic RAM device, an internal cache, a disk cache, as well as a variety of other types of devices. Typically, resources are accessed from the cache 140 faster than the time it takes to access the non-volatile storage device 125. The cache 140 stores data so that if the block manager module 135 needs to access resources from the storage device 125, the cache 140 may be checked first to see if the resources have already been retrieved. Thus, use of the cache 140 may improve the performance of the excitement system 110 in retrieving resource blocks.

IV. Excitement System and Methods

The excitement system and methods 110 maintain and track a set of excitement values associated with a resource. As blocks of the resource are requested by a user or client application 115, the set of excitement values is updated. By comparing the excitement values to a threshold, the excitement system and methods can determine which resource blocks to prefetch.

In the illustrative embodiments discussed herein, the resource is described as being stored as an array or list of data blocks, although this is not a limitation to the system. Moreover, the data blocks may be of a varying range of sizes and may include blocks of the same size and/or of different sizes. In the illustrative embodiments described herein, the location of a given resource block may be determined by a file offset, denoted by the variables. For further illustrative purposes, the retrieval mechanism of the storage device 125 or the cache 140 will be described as being a "reader" that can access blocks of the resource. The file offset of the resource block currently being read will be denoted by B.

In the following illustrative embodiments, the relative offset is the difference between the file offset of a given resource blocks and the file offset of the requested resource block. For example, the offset between a block located at x and the reader located at B is x−B. Thus, the relative offset (or simply "offset") measures the "distance" between a given block and the reader. As used herein, words such as "closer" or "farther" are used generally to denote, respectively, a relatively smaller or larger offset from the reader. Further, words such as "ahead" or "behind" are used generally to indicate, respectively, positive or negative offsets relative to the reader.

A. Cumulative Excitement Value

The excitement system and methods 110 maintain a set of excitement values associated with a resource that has been requested by a user or client application 115 or by a program or system in communication with the excitement system. The cumulative excitement value corresponding to a resource block located at file offset x is denoted by $E(x)$. The system may maintain a set of excitement values $E(x)$ that are in a one-to-one correspondence with the resource blocks. In some embodiments, the system maintains excitement values corresponding to a subset of the resource blocks so as to conserve system memory.

As resource blocks are requested, the excitement system and methods change the excitement values of blocks neighboring the reader by an amount $\Delta E$. The meaning of the term "neighboring" may depend on the details of the implementation of the excitement protocol. For example, in a read ahead application, the neighboring blocks may be those blocks located ahead of the reader. In some embodiments, neighboring blocks include those within a maximum relative offset from the reader. The maximum relative offset is called the horizon and is denoted by H. Alternatively, for example in a drop-behind application, neighboring blocks may include blocks behind the reader, at negative offsets. If the reader in the storage device 125 or cache 140 moves forwards and backwards through the resource file, then neighboring blocks may include blocks at both positive and negative relative offsets.

The change in the excitement value $\Delta E$ may depend on the resource, the cumulative excitement $E(x)$, the file offset x, the position of the reader, an elapsed time t, as well as other system and device parameters. The form of the change in excitement value $\Delta E$ may be tailored to meet the needs of the system. In some embodiments, the change $\Delta E$ may depend on the value of $E(x)$ to achieve, for example, a nonlinear excitement protocol. In other embodiments, the change $\Delta E$ is independent of the cumulative excitement. In some embodiments, different resources may be associated with different excitement protocols, which utilize different forms for $\Delta E$. For example, local or remote resources or high or low priority resources may be tracked differently. It is recognized that the cumulative excitement may be determined by solving an equation that relates its new value to a prior value and the change $\Delta E$. This equation may be, for example, an algebraic, differential, difference, integral, or integro-differential equation, and the solution of the equation may utilize analytical or numerical techniques.

In some embodiments, the change in excitement value $\Delta E(x)$ associated with a resource block at x is calculated according to an excitement function $f(y)$, which imparts $f(y)$ units of excitement at a location offset from the reader by y=x−B blocks. Note that the excitement function is defined to measure $f(y)$ units of excitement relative to the location of the reader whereas the cumulative excitement $E(x)$ is measured relative to the beginning of the resource. The shape of the excitement function $f(y)$ determines by how much neighboring blocks become excited as the resource is read. In some embodiments, the magnitude of the excitement function $f(y)$ generally decreases with increasing offset y to reflect the likelihood that resource blocks farther from the reader are less likely to be requested in the future than blocks closer to the reader. In embodiments with a horizon H, the excitement function $f(y)$ vanishes outside the horizon, for $|y|>H$. In some embodiments implementing a read ahead protocol, the excitement function $f(y)$ may be chosen to vanish behind the reader, for y<0, to reflect the fact that only blocks ahead of the reader are to be excited and prefetched.

The change in the excitement value $\Delta E(x)$ at file offset x as a result of a read of N blocks starting at file offset B is defined to be a convolution of the excitement function $f(y)$ with a window function $w(y)$ that defines the range of resource blocks being read:

$$\Delta E(x) = \int_{-\infty}^{+\infty} f(x-t)w(t)dt. \tag{1}$$

The convolution integral measures the overlap between the excitement function and the window function and is integrated over the possible file offsets. Based on the well-known mathematical nature of the convolution, the change in excitement value corresponding to a resource block at x will tend to be large when there is significant overlap between the excitement function and the window function. Typically, the overlap tends to be larger for those blocks positioned closer to the reader than for those blocks positioned farther away.

It is recognized that window functions may be selected from a large variety of mathematical functions such as, for example, a rectangle, a Gaussian, an exponential, a portion of a trigonometric function, or a signal processing function such as a sinc function in order to achieve different overlap properties in Eq. (1). In some embodiments, the window function is assumed to vanish outside the range of blocks from which data is being read, so that $w(y)$ is zero for file offsets outside [B, B+N]. In such embodiments Eq. (1) becomes $$\Delta E(x) = \int_B^{B+N} f(x-t)w(t)dt \tag{2}$$

Figure 2A:
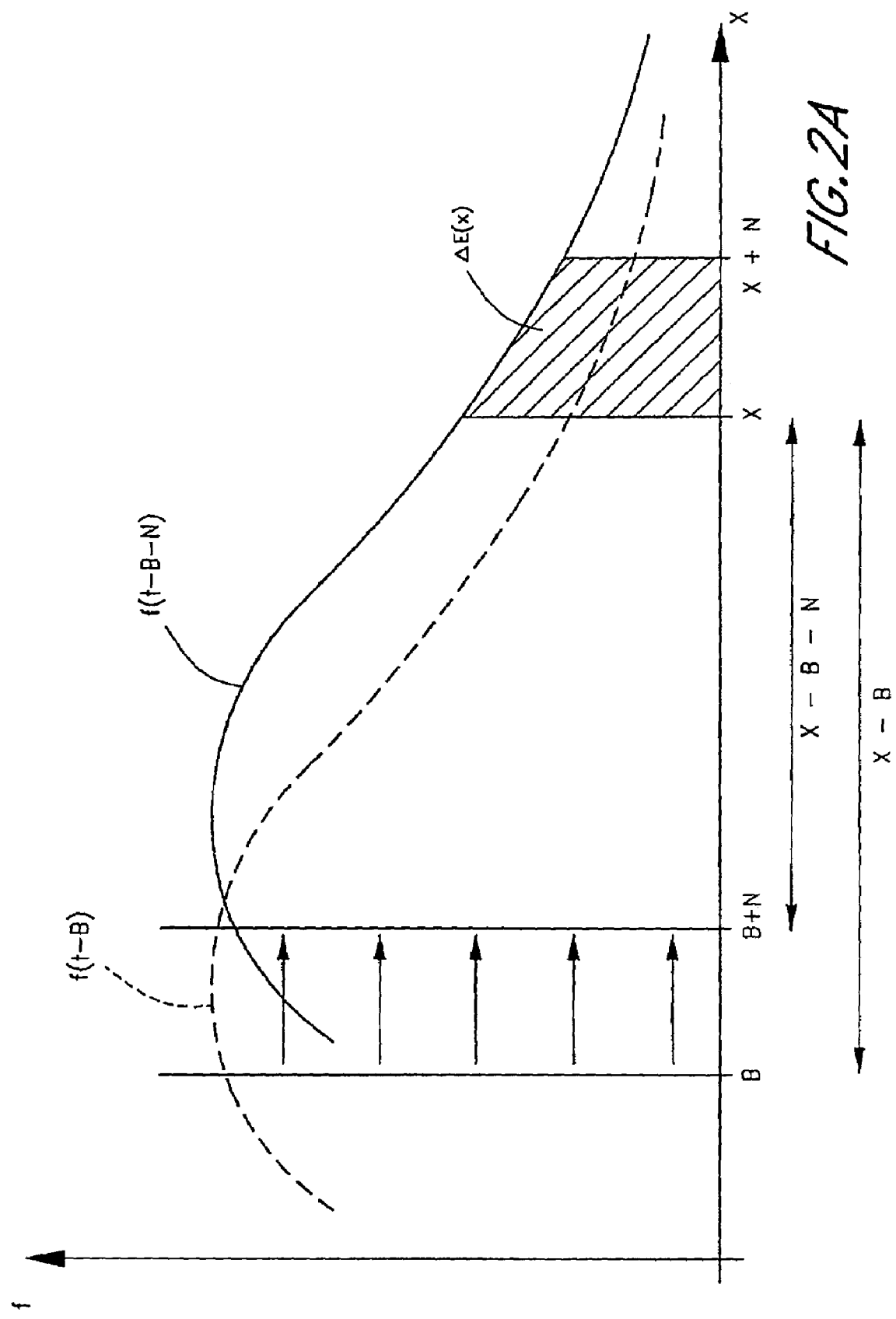
FIG. 2A illustrates an embodiment of a calculation of excitement values.

In one embodiment, the window function is taken to be rectangular with a constant value equal to one. By changing variables in the integral and inserting $w(t)=1$, Eq. (2) may be written as $$\Delta E(x) = \int_x^{x+N} f(t-B-N)dt = F(x-B)-F(x-B-N) \tag{3}$$

where $f$ is assumed to be integrable in the range [x−B, x−B−N] and where F is the antiderivative of $f$, namely, $F(x)=\int^x f(u)\,du$. FIG. 2A illustrates that the change in the excitement value ΔE(x) is directly related to the area under the excitement function curve $f(y)$ in embodiments using the rectangular window function. If the excitement function $f(t)$ is analytically integrable so that F(x) may be determined in terms of standard mathematical functions, the integral in Eq. (3) need not be performed numerically. In such a case, the change in excitement at file offset x may efficiently be determined from knowledge of the function F(x) and the relative offset at the beginning of the read, x−B, and the relative offset at the end of the read, x−B−N.

As seen in FIG. 2A, the shape and magnitude of the excitement function $f(y)$ will determine how much excitement will accumulate in blocks positioned away from the reader. For example, if the excitement function has a long tail extending to large offsets, blocks far ahead of the reader will be excited. Alternatively, in embodiments in which the excitement function vanishes beyond a horizon H, only blocks within the horizon will be excited. Also, if the excitement function has a general shape similar to the example illustrated in FIG. 2A, blocks closer to the reader, where $f(y)$ is larger, will be excited more than blocks farther from the reader where $f(y)$ is smaller.

Figure 2B:
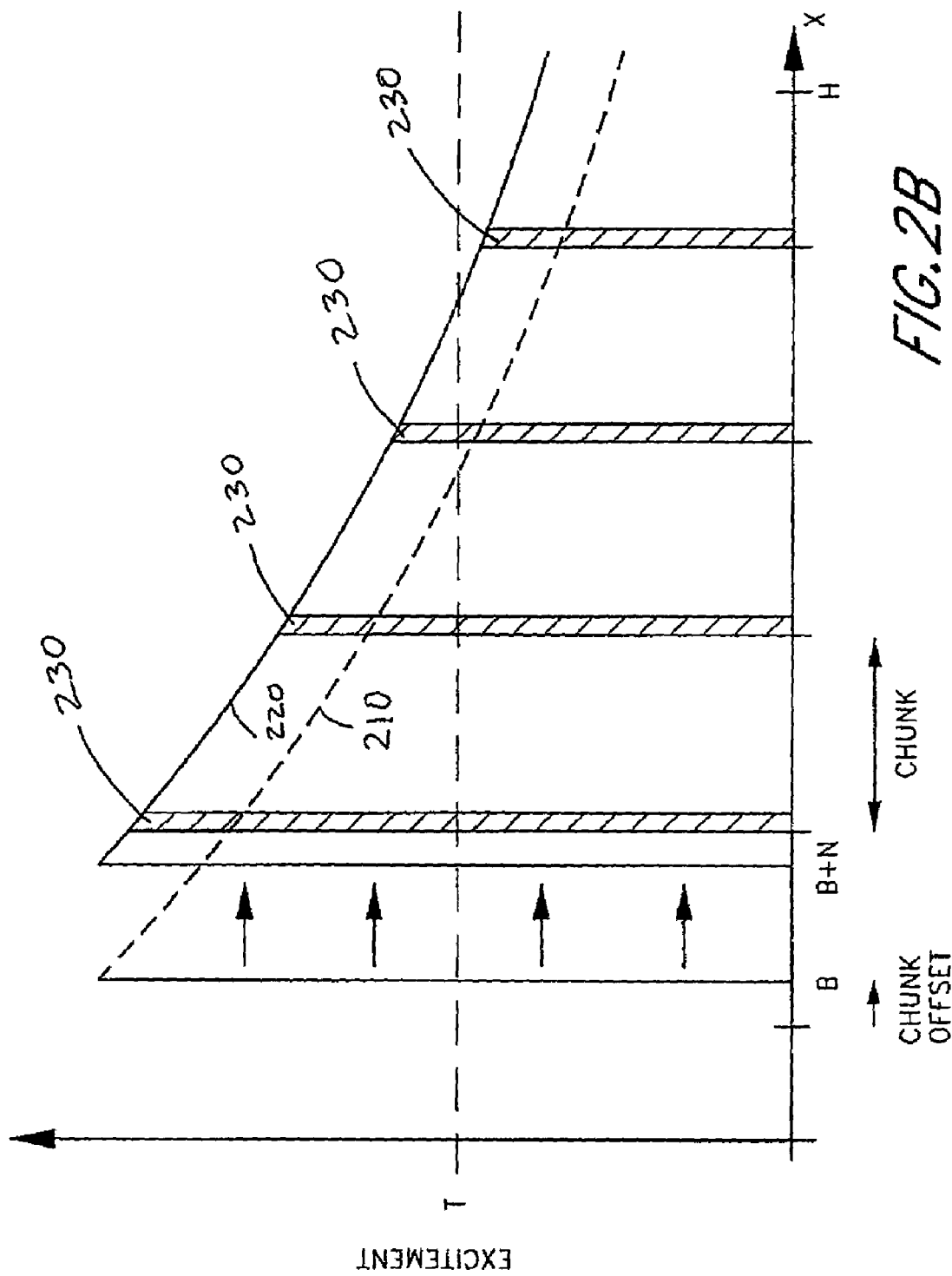
FIG. 2B illustrates an embodiment of a calculation of excitement values.

FIG. 2B illustrates one embodiment of the calculation of excitement values during a read of N bytes. In this embodiment, the storage device 125 is organized into "chunks," which may include one or more blocks of the resource. The size of the chunk in bytes depends on the characteristics of the storage device 125, and in some embodiments may be, for example, 2 kB, 8 kB, 32 kB, 64 kB, or 128 kB and so forth. It is recognized that the chunk may be of different sizes and may depend on characteristics other than those of the storage device 125, or a combination thereof. In the example, the data being read correspond to bytes between file offsets B and B+N. In general, a read request will not begin on a chunk boundary but will start at an offset from the chunk boundary. In the example illustrated in FIG. 2B, the N bytes being read are less than the width of a chunk, but this is not a limitation to the system. In FIG. 2B, an example excitement function is shown as a dashed line 210 at the beginning of the read and is shown as a solid line 220 at the end of the read. In this embodiment, the excitement values are stored for only the first byte of every chunk in order to reduce the amount of memory allocated to the excitement system. If the excitement value of the first byte of any chunk exceeds the threshold T, then the entire chunk is prefetched by the system. Excitement values are stored out to a horizon H, which in some embodiments may correspond to 4, 8, 16, 32, 64, 100, 128 or more chunks, but in other embodiments, may correspond to a different number of chunks.

The shaded portions 230 in FIG. 2B illustrate that the change in excitement values corresponding to the first byte of every chunk are determined by the area under the excitement function 220 according to Eq. (3). The calculation of ΔE(x) is facilitated if the antiderivative F(x) is known analytically. In one embodiment, a scratch cache is allocated to the calculation of ΔE(x) Values of the antiderivative F(x) for the possible chunk offsets and read sizes N may be calculated once and stored in the cache enabling rapid evaluation of ΔE(x) for any chunk. Alternatively, appropriate values for F(x) may be stored in a lookup table suitable for interpolation or as a parameterized curve such as a spline.

The set of excitement values corresponding to a resource may be stored in a data structure such as, for example, an array, a list, or a tree. It is recognized, however, that a variety of data structures may be used as recognized by those of ordinary skill in the art. In one embodiment, a hash table is created at system load, and a node associated with a resource is created the first time the resource is read. Each node is a data structure that stores information such as the resource name, the chunk offset, and the set of excitement values associated with the resource. Additionally, the node may store the maximum or minimum excitement value in the set and whether a resource block has already been prefetched and stored in memory or cache. In some embodiments, the hash key may include the resource file name in order to associate the resource with the set of excitements stored in the node. The node data structure may be, for example, an array, a list, a tree, a table, a file, or other data structure know to those of ordinary skill in the art. As additional resources are accessed, additional nodes are added, and the hash table is grown. In one embodiment, one global hash table is created, which may be accessed by the users and/or processes. In some embodiments there may be more than one hash table associated with the resources such as, for example, those stored in a local or remote device or cache.

In one embodiment, the nodes are organized into a heap sorted by minimum excitement value. The use of a heap efficiently enables the system to determine efficiently which node has the smallest excitement value and to discard the node if its excitement value is sufficiently small. The use of a heap advantageously enables the system to conserve memory by discarding rarely used nodes. In embodiments implementing excitement decay as discussed in Sec. IV.C, the use of a heap enables efficient pruning of decayed nodes. If the resource corresponding to a discarded node is re-accessed, the node data structure is recreated. It is recognized that data structures other than heaps, as known by those of ordinary skill in the art, may be used for this purpose such as, for example, lists, arrays, queues, stacks, or other types of tree.

B. Excitement Function

Several embodiments of the excitement function are illustrated in FIGS. 3A-3D, which plot the value of $f(y)$ on the vertical axis as a function of the relative offset y on the horizontal axis. The graphs also show a representative value of the threshold T used in determining which blocks to prefetch.

Figure 3A:
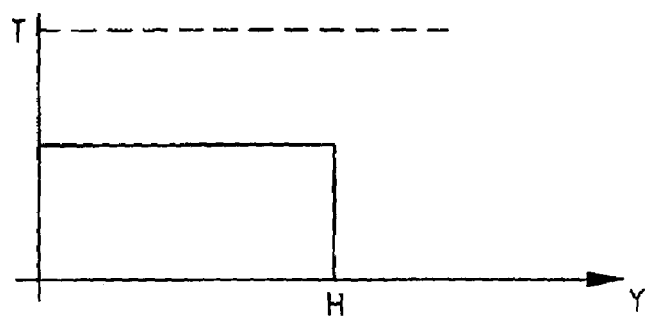
FIG. 3A illustrates an embodiment of an excitement function.

FIG. 3A depicts an embodiment in which the excitement function is rectangular, such that $f(y)$ is constant within the horizon H and is zero beyond the horizon. In some embodiments, the constant value of $f(y)$ may be less than the threshold T, in which case the block may require several increments of excitement before it reaches the threshold and is prefetched. For example, the constant value may be set at, for example, T/4, T/3, T/2, or some other value. In other embodiments, the constant value of $f(y)$ may be larger than the threshold such that the blocks within the horizon are prefetched the first time they are excited. For example, the constant value may be set at, for example, T, 2T, 3T, 4T, or some other value. The width of the horizon and the constant value of $f(y)$ may be tuned to meet the requirements of the excitement system.

Figure 3B:
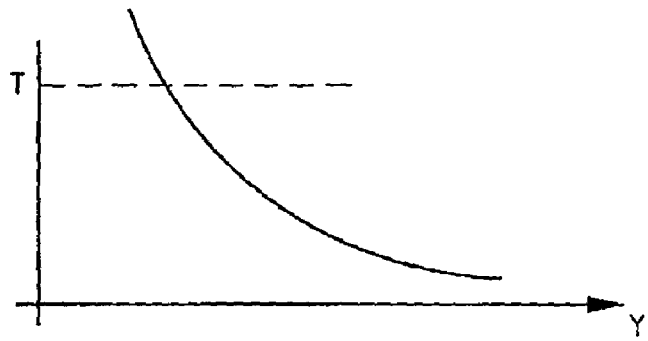
FIG. 3B illustrates an embodiment of an excitement function.

FIG. 3B depicts an embodiment in which the excitement function decreases with increasing offset. In some embodiments, the excitement function is inversely proportional to offset such that $f(y)=c/y$, where c is a constant. In embodiments using excitement functions that are generally decreasing functions, resource blocks closer to the reader receive larger excitements and are more likely to be prefetched than resource blocks far from the reader.

Figure 3C:
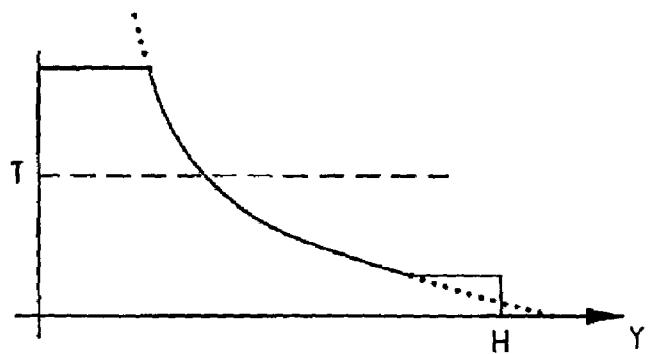
FIG. 3C illustrates an embodiment of an excitement function.

FIG. 3C depicts an embodiment combining several of the features illustrated in FIGS. 3A-3B. The dotted curves indicate the excitement function illustrated in FIG. 3B. As shown in FIG. 3C, at small offsets the excitement function may be capped at a maximum value, which advantageously avoids the singularity at zero in embodiments using $f(y)=c/y$. The maximum value may be selected to be above the threshold, as shown in FIG. 3C, or may be selected to be below the threshold. At larger offsets, the excitement function may use a rectangular profile truncated at the horizon H instead of a long tail. A benefit of using a horizon is reduced memory consumption, because small excitement values in a long tail do not have to be stored or updated by the system.

In the embodiments depicted in FIGS. 3A-3C, the excitement function is zero for negative offsets. Embodiments such as those depicted in FIGS. 3A-3C are advantageous in read ahead applications where only blocks ahead of the reader are to be prefetched. In other embodiments, the excitement function may be nonzero for negative offsets. For example, the excitement function may be selected to be symmetric about the vertical axis in embodiments where the reader moves forward and backward through a file or different excitement functions may be selected for forward and backward movement.

Figure 3D:
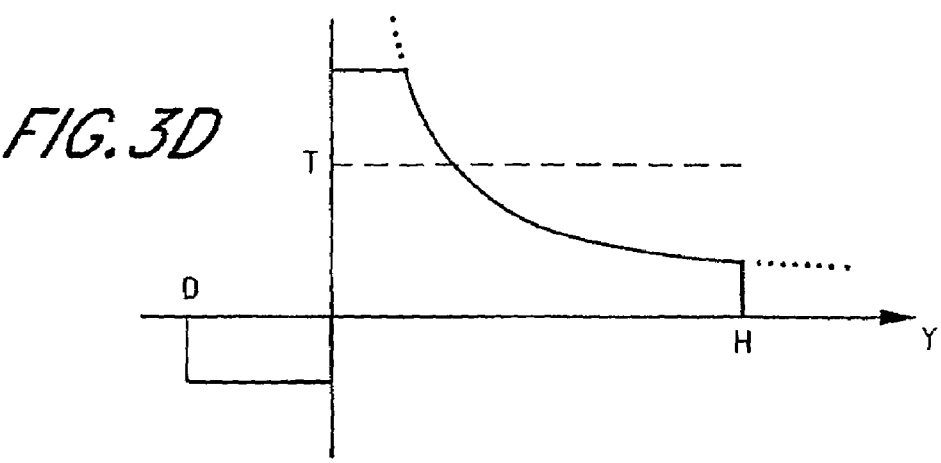
FIG. 3D illustrates an embodiment of an excitement function.

The excitement functions illustrated in FIGS. 3A-3C are positive, although this is not a requirement or limitation of the system and methods. FIG. 3D depicts an embodiment that for positive offsets is similar to that shown in FIG. 3C. For negative offsets, the excitement function is illustrated as a rectangle having a negative value. The rectangle is truncated at a negative horizon offset labeled as D. Regions of $f(y)$ having negative values tend to reduce the value of the integral in Eq. (3), and thus tend to "de-excite" corresponding resource blocks.

Excitement functions with negative values may be useful in embodiments of the system implementing a "drop behind" caching scheme. A caching protocol determines how long to store resource blocks in the cache before evicting them to make space for new blocks. For example, a common caching scheme uses the Least Recently Used ("LRU") algorithm, which is based on the principal that once data is accessed it will most likely be accessed again. Thus, data is stored in order of its last usage such that data that has not been accessed for the longest amount of time is discarded. The excitement system and methods may be used to provide an alternative caching scheme to determine which blocks to drop from memory or cache. An excitement function having negative values, as shown in FIG. 3D, may be advantageously used in a drop behind scheme. Blocks that have already been read and stored in memory, e.g., those at negative offsets, accumulate negative excitement values and are de-excited. Blocks may be dropped from memory when their excitement values drop below a second threshold. An advantage of this drop behind scheme is that the size of the negative horizon D and the shape of the negative portion of $f(y)$ may be adjusted to achieve improved cache performance compared to an LRU algorithm.

The embodiments of excitement functions in FIGS. 3A-3D are shown for illustrative purposes and are not intended to limit the scope of possible choices for the functional form of $f(y)$. FIGS. 3A-3D are intended to show some of the features relevant to the excitement system such as, for example, horizons, thresholds, and characteristic shapes for $f(y)$. It is recognized that other forms for the excitement function may be adopted. For example, a function with one or more adjustable parameters may be used, and the system may update the parameters so as to improve system throughput and performance. Further, the parameters may be tuned to achieve the objectives of a user.

C. Excitement Decay

The excitement system and methods may also implement a decay of excitement values with respect to elapsed processor time. In embodiments providing for decay, determination of whether a resource block is prefetched depends on a balance between how much the block is excited and how much its excitement value decays. For example, even though a resource block accumulates excitement when neighboring blocks are accessed, the block may not be prefetched because the accumulation is insufficient to overcome the decay of excitement with time. Advantageously, the system may release memory used to store excitement values once the values have decayed to sufficiently small values.

In embodiments that implement decay, the cumulative excitement value $E(x,t)$ is a function of both file offset x and time t, and the changes in $E(x,t)$ due to both the excitement function and the decay is accounted for. For example, in one embodiment, the excitement value at file offset x changes in one clock tick to $$E(x,t+1)=E(x,t)+\Delta E(x)+\Delta E_d(x,t) \qquad (4)$$

where the change in excitement value due to decay is denoted by $\Delta E_d$. Equation (4) represents one method for calculating the cumulative excitement at a new time. It is recognized that the cumulative excitement may be calculated from equations other than Eq. (4) and that the calculation may utilize analytical and/or numerical methods.

In some embodiments, excitement decay is modeled as an exponential decay in which $\Delta E_d=-\alpha E$ where $\alpha$ is an exponential decay constant. In embodiments utilizing exponential decay, the excitement value decreases exponentially towards zero in the absence of further excitement and will reach one-half of its value in a time equal to $\ln(2)/\alpha$, where $\ln(2)\approx 0.6931$ is the natural logarithm of 2.

Alternatively, in some embodiments excitement decay is modeled as a linear decay in which $\Delta E_d=-a$ where a is a linear decay constant. In embodiments utilizing linear decay, and in the absence of further excitement, E decreases linearly with time and reaches zero in a linear decay time equal to E/a, after which E is assumed not to decay further.

A benefit of using linear decay is that exponential factors, which are costly to compute, are avoided. Furthermore, since there is a linear relationship between the excitement value and the linear decay time, an additional benefit is that the system may store the time at which the excitement value decays to zero rather than the excitement value itself. In one embodiment, the excitement decay times are sorted into a heap in which the root node stores the smallest excitement decay time. If the system time exceeds the root node decay time, the excitement value corresponding to the root node has decayed to zero. In this case, the root node is deleted from the heap. This process may be iterated to remove nodes corresponding to excitement values that have decayed to zero. It is recognized that data structures other than a heap such as, for example, arrays, linked lists, other types of trees, or other data structures may be used to perform the removal of decayed excitement values from the system.

D. Selection of Excitement Function

The excitement function $f(y)$ may be selected according to the requirements of the user of the excitement system. For example, in embodiments using the rectangular excitement function depicted in FIG. 3A, the height and width of the rectangle and the value of the threshold may be determined so as to maximize system performance and throughput. In one embodiment, the system may monitor throughput and adjust these parameters on a real-time basis. In another embodiment, the parameters may be preset at system load time based on average user requirements. In one embodiment, a ratio of the threshold to the rectangle height equal to 3-to-1 was found to improve average system performance.

Some embodiments provide the system with a switch to enable selection of several different excitement functions depending on the requirements of the users. For example, in one embodiment the system may switch between the excitement functions illustrated in FIGS. 3A-3C.

1. "Just-In-Time" Excitement Function

In some embodiments, the system may provide "just-in-time" read ahead wherein the prefetch for a resource block is initiated early enough so that the prefetch is completed just as the reader reaches the resource block. A benefit of using a just-in-time excitement function is that resource blocks are prefetched at a rate that matches the read speed of the storage device 125 so that blocks are prefetched neither too soon nor too late.

An embodiment of a just-in-time excitement function may be determined by adjusting the system parameters so that the offset where the cumulative excitement of a resource block reaches the threshold is proportional to the read speed of the storage device 125. This choice of excitement function enables the system to prefetch enough blocks to satisfy the demands of fast readers while not clogging the system with too many blocks in the case of slow readers.

The following sample calculation demonstrates how one embodiment of the just-in-time excitement function may be utilized in an embodiment of the excitement system. The following calculation is intended to serve as an instructive example, and it is recognized that the just-in-time excitement function may have a different form and may have different parameters in other systems having different device characteristics.

In the sample calculation, the read speed of the storage device 125 is assumed to be a constant value R. It is further assumed that prefetch requests take the same time b to complete and that b is independent of R. In one embodiment of the system, b is determined as the timescale within which 95% of all prefetch requests are completed and may range from about 1 ms to about 20 ms in disk drive devices. As the storage device becomes busy, b may increase in value. An embodiment of the excitement system and methods may enable the system to monitor b and to adjust the other parameters in accordance with any change in the prefetch time.

In this example calculation, a linear decay is assumed such that the decay rate is a constant value, a. In some embodiments, a may be normalized to a value equal to one. The threshold at which prefetch requests are issued is assumed to be a constant value T. The excitement function $f(y)$ is a function of the offset y from the position of the reader. In the following, the excitement function will be taken to be measured in the SI unit of temperature, the Kelvin (K), although any other unit will do. By adopting this unit, a read request for a resource block may be thought of as increasing the "temperature" of neighboring blocks. The neighboring blocks may be prefetched when they have become sufficiently "hot" that their cumulative excitement exceeds the threshold. The parameters corresponding to this example calculation and convenient choices for their units are listed in Table 1.

TABLE 1

| Parameter | Description | Units |
|---|---|---|
| $f(y)$ | The excitement function | Kelvin (K) |
| y | The offset from the reader | Bytes (B) |
| $F(y)$ | The antiderivative of the excitement function | B · K |
| $\Delta E(y)$ | The cumulative excitement function | B · K |
| b | The time required to complete a prefetch | Seconds (s) |
| R | The read speed of the storage device | B/s |
| a | The linear excitement decay rate | B · K/s |
| T | The threshold at which blocks are prefetched | B · K |
| H | The excitement horizon | B |
| c | The proportionality constant in the excitement function that is inversely proportional to offset | B · K |
| k | The ratio c/ab | dimensionless |
| M | The memory of the system | s |

In the following analysis, it is convenient to measure offsets relative to the position of the reader, y, rather than from the beginning of the resource file as in Sec. IV.A. Eq. (3) for the cumulative excitement due to a read of N bytes starting at initial offset y can be transformed to $$\Delta E(y) = \int_{y-N}^{y} f(u)du = F(y) - F(y-N) \quad (5)$$

An excitement horizon H may be defined as the offset from the reader at which the increase in excitement due to excitement from the excitement function just balances the decrease in excitement due to decay. There is net accumulation of excitement only for offsets within the excitement horizon. Advantageously, the system need track excitement values only for those resource blocks within the horizon. The excitement horizon may be calculated as follows. For an incremental read of δN bytes, the increase in excitement at the horizon is seen from Eq. (5) to be approximately $f(H)\delta N$. The incremental read takes an incremental time $\delta t = \delta N/R$ to be performed by the reader, during which the excitement decays by an amount $a\delta t = a\delta N/R$. The excitement horizon may be calculated by setting the increase in excitement equal to the decrease due to decay, which yields $$H = f^{-1}\left(\frac{a}{R}\right) \quad (6)$$

where $f^{-1}$ is the inverse of the function $f$.

As the reader moves through the storage device 125 at the constant rate R, the excitement for a given resource block accumulates according to Eq. (5) while also decaying at the linear rate a. Since a net amount of excitement does not accumulate until a block is within the excitement horizon H, the cumulative excitement of the block from the time it enters the excitement horizon until the time it is at relative offset y is $$\Delta E(y) = F(H) - F(y) - \frac{a}{R}(H - y). \quad (7)$$

In some embodiments, the prefetch decision is made by an arithmetic comparison between the cumulative excitement in Eq. (7) and the threshold T such that a block is prefetched at the first offset position satisfying $\Delta E(y) \geq T$. In embodiments implementing a just-in-time read ahead policy, it is desirable for the prefetch offset to be directly proportional to the read speed R in order for the prefetch to be completed by the time the reader gets to the block. In such embodiments, the prefetch offset is equal to bR, where b is the prefetch time.

In one embodiment, the functional form of the excitement function may be determined by inserting the just-in-time prefetch offset bR into Eq. (7) and requiring that the resulting expression for $\Delta E(bR)$ be invariant with respect to R. Taking the derivative of this expression with respect to R yields the following relationship $$bRf(bR) = \frac{a}{R} f^{-1}\left(\frac{a}{R}\right). \quad (8)$$

A function satisfying Eq. (8) is $$f(y) = \frac{c}{y} \quad (9)$$

where c is a constant. It is convenient to define a dimensionless ratio k=c/ab, which is greater than one for the cumulative excitement to be positive. The ratio k may be tuned to meet system and/or user needs and/or preferences; in one embodiment, the value k=4 was found to be appropriate. The threshold T is related to other parameters of the system according to $$\frac{T}{ab} = k \ln k + 1 - k \quad (10)$$

where lnk is the natural logarithm of the ratio k. For this embodiment of the excitement function, prefetches are made within the horizon at an offset equal to H/k. In some embodiments it proves convenient to define a quantity called the memory of the system, M, which is the time it takes for a threshold excitement value to decay to zero and is equal to T/a. The ratio of the memory to the prefetch time is M/b, and its value is given in terms of the ratio k by the right hand side of Eq. (10).

The excitement function given in Eq. (9) is plotted in FIG. 3B. To avoid the singularity at y=0, some embodiments cap the maximum value, as shown in FIG. 3C. To avoid the tail extending to large offsets, some embodiments truncate the function at the horizon H. In embodiments implementing read ahead protocols, the system may use the functional form for $f(y)$ given in Eq. (9) for positive offsets while setting $f(y)$ to be zero for negative offsets. If the reader moves backward and forward in the storage device 125, the excitement function in Eq. (9) may be reflected symmetrically about the axis y=0 or different excitement functions may be used.

In some embodiments, the read speed parameter R corresponds to a maximum expected read rate for which the excitement system may provide just-in-time read ahead. The underlying read speed of the storage device 125 will generally be less than R, but it may be larger in some cases. Embodiments of the excitement system using the excitement function given by Eq. (9) advantageously provide just-in-time read ahead for any constant read rate less than the maximum expected read rate. A benefit provided by these embodiments is the simplicity of using a single excitement function to handle all read speeds below the maximum expected read rate.

E. Threshold

The system determines when to prefetch a resource block by comparing the cumulative excitement with the threshold. In some embodiments, the comparison is an arithmetic inequality such that the block is prefetched when its cumulative excitement is greater than or equal to the threshold. A benefit to this scheme is its ease of implementation and its speed during execution.

It is recognized that other comparisons may be made to determine when to prefetch a block. For example, a prefetch may be issued only if the cumulative excitement exceeds the threshold for at least a minimum amount of time. A system implementing such a comparison may improve performance by not prefetching blocks whose excitement exceeds the threshold only briefly. Alternatively, an embodiment of the system may track a frequency distribution of cumulative excitements and select the blocks to prefetch based on a statistical analysis of the frequency distribution.

Some embodiments of the excitement system may utilize more than one threshold parameter. For example, different thresholds may be set for resources stored locally versus those stored remotely. Further, some embodiments may adopt different thresholds for resources having, for example, greater importance to the user or greater access frequency.

Furthermore, different excitement functions and excitement parameters may be utilized in systems where there is more than one cache, for example an L1 cache for remote resources and an L2 cache for local resources. A benefit of the excitement system is the flexibility with which it may be adapted to meet the requirements of the users and client applications accessing the resources.

VI. Excitement System Processes

A. Retrieving Resources

Figure 4:
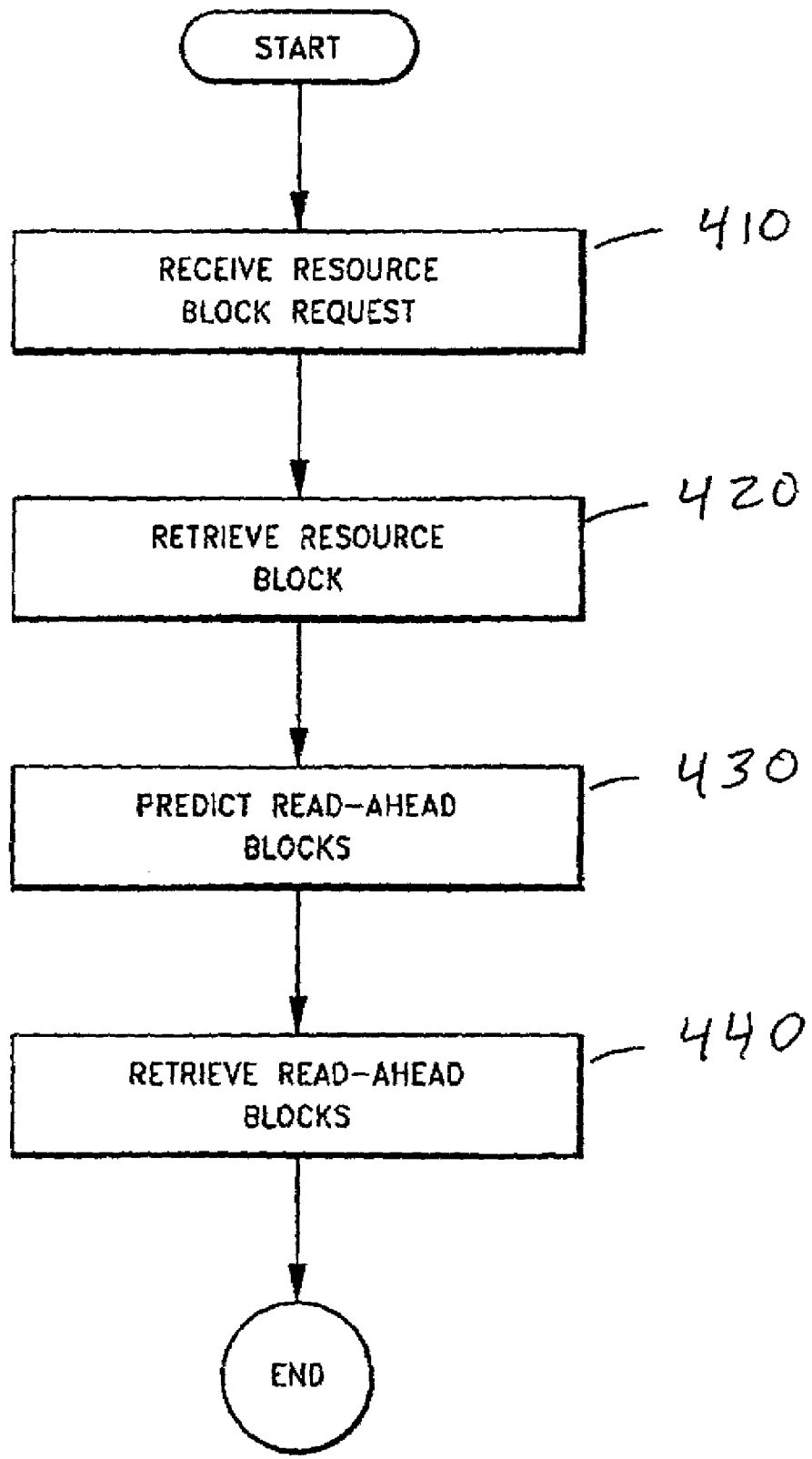
FIG. 4 illustrates an embodiment of a flowchart for retrieving resources.

FIG. 4 illustrates one embodiment of a flow chart for retrieving resources. A variety of resources may be retrieved, such as, for example, data files, graphics files, sound or video files, images, databases, metadata, software, programs, or processes.

Beginning at a start state, the retrieve resource process receives a request for a set of resource blocks (block 410). This request may originate with a user or a client application. The request may be for the entire resource or just a portion.

Figure 5:
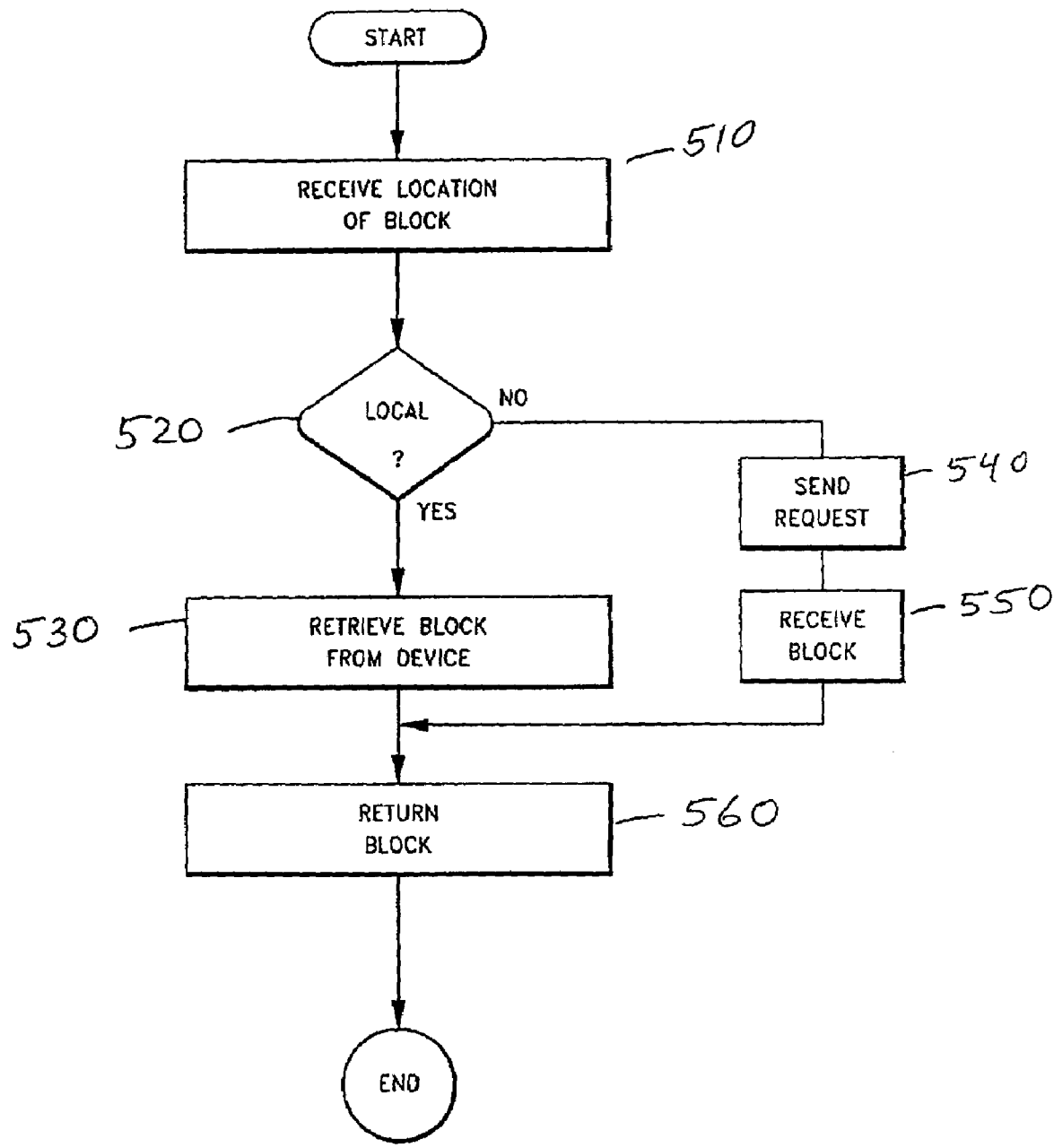
FIG. 5 illustrates an embodiment of a flowchart for retrieving a resource block.

Next, the system retrieves the requested resource block (block 420). The retrieval may be performed as illustrated in FIG. 5, though other processes may be used. The retrieved resource blocks may be retrieved from local or remote storage and may be stored in local memory or cache.

The system may then predict which resource blocks are to be prefetched using the excitement protocol (block 430), though other protocols may be used. In some embodiments, the system utilizes the just-in-time excitement function described herein. The system may then signal the retrieve read ahead blocks process to retrieve the predicted blocks from the storage device (block 440) as illustrated in FIG. 5, though other processes may be used. The process then proceeds to an end state.

It is recognized that FIG. 4 illustrates one embodiment of a retrieve resources process and that other embodiments may be used. In another example, more than one retrieve resources process may be used at the same time such that data is being retrieved by multiple retrieve resources processes in parallel using techniques or combination of techniques, such as, for example, parallel processing, pipelining, or asynchronous I/O. In another embodiment, the retrieve resources processes may be implemented in both a local storage device and a remote storage device. The excitement protocols used for local retrieval and remote retrieval may differ and may be adjusted to improve performance in each storage device. In other embodiments, two caches may be used in which an L1 cache stores remote resource blocks and an L2 cache stores local resource blocks. In such embodiments, different excitement protocols may be used in each cache, and the excitement protocols may be coordinated so that the L1 prefetch occurs before the L2 prefetch.

B. Retrieving Resource Blocks

FIG. 5 illustrates one embodiment of a flowchart for retrieving resource blocks. Beginning at a start state, the retrieve data process receives the location at which the resource is stored (block 510). In one embodiment, the location may be designated using a storage device ID and an offset or block address. In other embodiments, the storage device's ID may be used, whereas in other embodiments, a table or other data structure may be used to map the IDs onto other IDs, and so forth.

Next, the retrieve resource block process determines whether the resource is stored locally (block 520). If the resource block is stored locally, then the retrieve resource block process retrieves the block from local storage (block 530). In one embodiment, the retrieve resource block process may first check the cache and if the resource block is not there, then check the storage device. In other embodiments, the retrieve resource block process may check only the storage device.

If the resource block is not stored locally, then the retrieve resource block process sends a request for the block to the storage device on which the data is stored (block 540). In one embodiment, the request is sent via the block manager module 135 shown in FIG. 1. The receive resource process then receives the requested block (block 550).

The retrieve resource block process collects the block that has been requested and returns the block (block 560). In some embodiments, the block is returned after the entire set of resource blocks has been collected. In other embodiments, portions or sets of the resource are returned as the resource is retrieved form local storage or received from other storage devices. The portions may be returned in sequential order or they may be returned as they are retrieved or received. After the data has been returned, the retrieve resource block process proceeds to an end state.

It is recognized that FIG. 5 illustrates one embodiment of a retrieve resource block process and that other embodiments may be used. In another example, more than one retrieve resource block process may be used at the same time such that data is being retrieved by multiple retrieve resource block processes in parallel using techniques or combination of techniques, such as, for example, parallel processing, pipelining, or asynchronous I/O.

C. Predicting Resource Blocks

Figure 6:
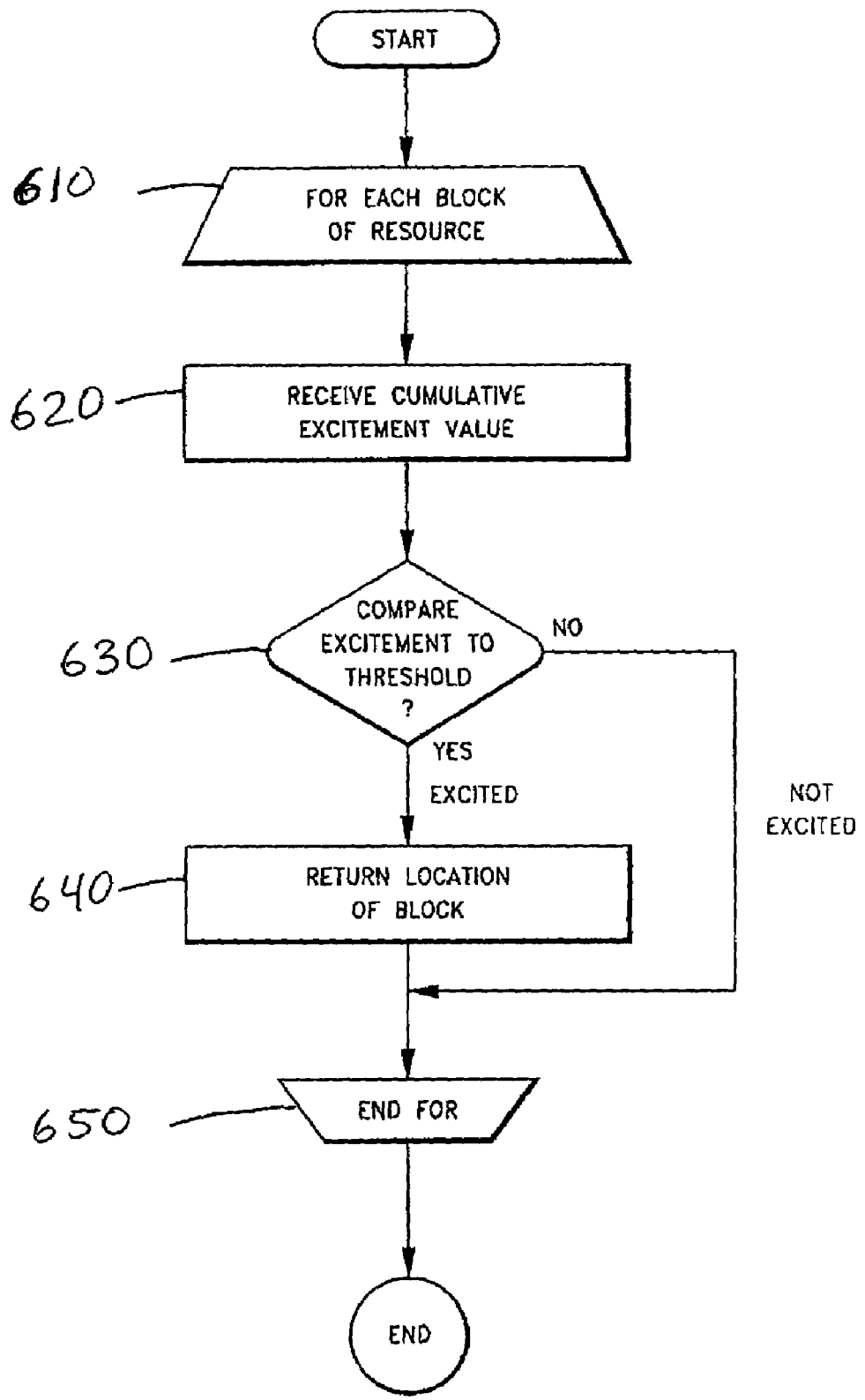
FIG. 6 illustrates an embodiment of a flowchart for predicting a set of resource blocks.
Figure 7:
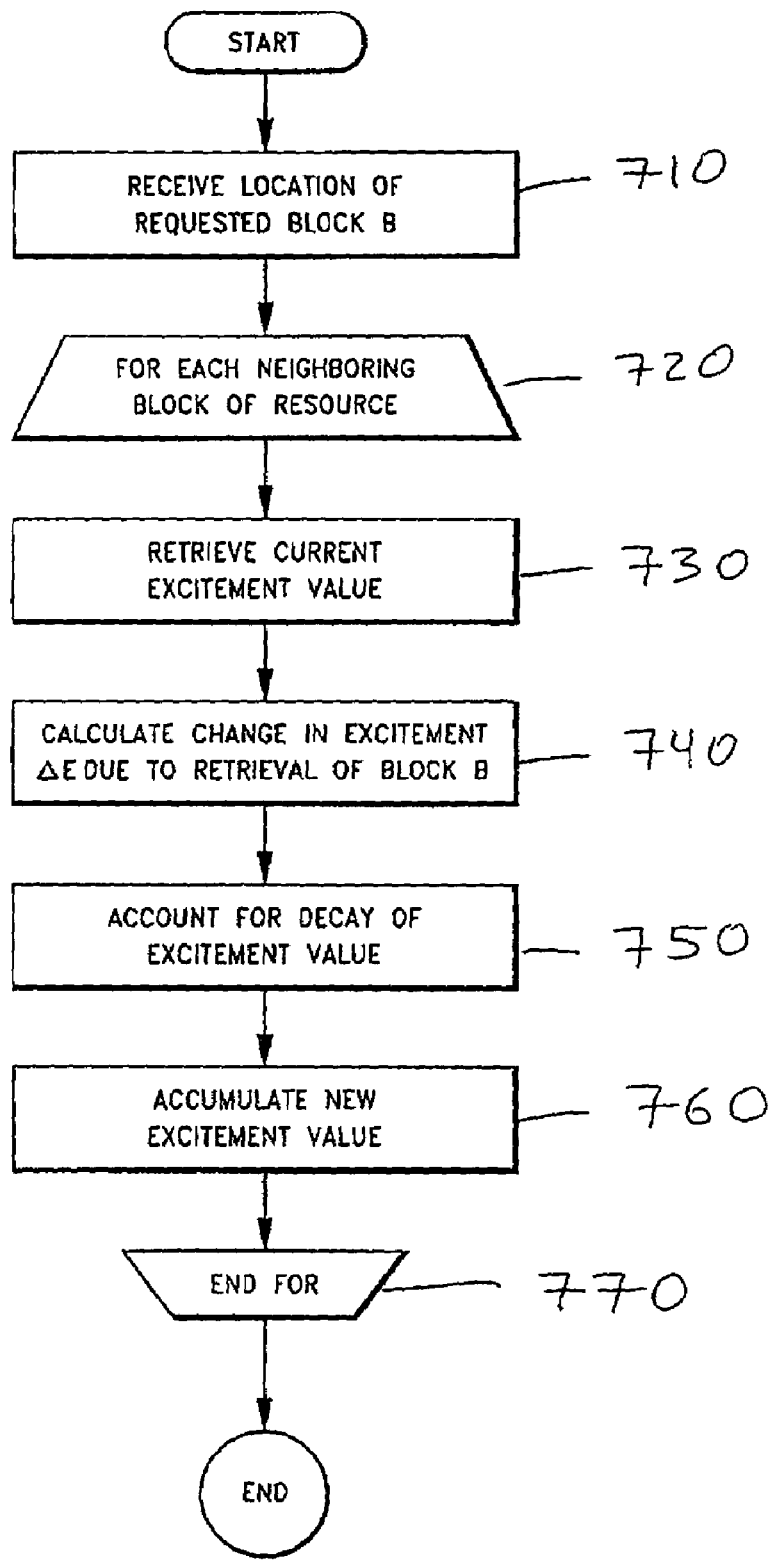
FIG. 7 illustrates an embodiment of a flowchart for updating excitement values.

FIG. 6 illustrates one embodiment of a flow chart for predicting which resource blocks ("prediction process") are to be prefetched. Beginning at a start state, for each block of the resource (blocks 610, 650) the prediction process receives the cumulative excitement value associated with the resource block (block 620). The cumulative excitement value may be determined as illustrated in FIG. 7.

The prediction process then compares the excitement value to the threshold to determine whether the block is excited (block 630). Some embodiments make this comparison via an arithmetic inequality so that a block is determined to be excited if its cumulative excitement value exceeds the threshold. Other embodiments may implement a comparison scheme that, for example, requires the cumulative excitement to exceed the threshold for a specified amount of time. Still other embodiments may utilize a statistical analysis of a frequency distribution of excitement values to make the comparison.

If the comparison (block 630) indicates the block is excited, the prediction process returns the location of the block (block 640). If the comparison indicates the block is not excited, the prediction process proceeds to the next block in the resource. When the resource blocks have been processed, the prediction process proceeds to an end state.

It is recognized that implementations of the prediction process other than that illustrated in FIG. 6 may be used. For example, in most read ahead embodiments, only the blocks ahead of the reader are to be prefetched. In such embodiments, the processing loop (blocks 610, 650) loops over only blocks with positive offsets from the reader. In some embodiments, rather than returning the location of a predicted block (block 640), the prediction process may instead retrieve the block.

D. Process for Updating Excitement Values

FIG. 7 illustrates an embodiment of a flowchart for updating excitement values ("excitement update process"). Beginning at a start state, the excitement update process receives the location of the currently requested resource block at the location B of the reader (block 710).

For each neighboring block of the resource (blocks 720, 770), the excitement update process retrieves the current value of the excitement function corresponding to a given resource block (block 730). In some embodiments, the loop over neighboring blocks (blocks 720, 770) may include all blocks of the resource. In other embodiments, such as those implementing read ahead schemes, the neighboring blocks include those ahead of the position of the reader at B, e.g., blocks with positive offsets. In some embodiments, the neighboring blocks include only those within the excitement horizon. If the block has not previously been excited, storage space is allocated for the excitement value.

The excitement update process then calculates the change in the excitement value $\Delta E$ caused by the read of the resource block at B (block 740). The calculation may implement the methods described herein. Some embodiments may use a scratch cache to store values of $\Delta E$ for a range of relevant offsets in order to speed up the evaluation of the change in excitement. Other embodiments may use a lookup table or fit a curve, such as a spline, to $\Delta E$. In embodiments in which the excitement function is not readily integrable in terms of standard mathematical functions, the integral in Eq. (1) may be performed numerically.

In embodiments implementing a decay of excitement value, the excitement update process may account for the decay (block 750). The amount of decay will depend on whether a linear, an exponential, or other type of decay is used. A benefit of linear decay is that it may be calculated rapidly. A benefit of exponential decay is that it mimics many common natural sources of decay.

Next, the new excitement value may be calculated (block 760) by accumulating the change due to excitement (block 740) and the change due to decay (block 750). It is recognized that this accumulation may proceed in one or more steps. For example, in one embodiment the changes are calculated in separate steps and then combined by simple summation. In other embodiments, the net change may be calculated in one step. Accordingly, in some embodiments, the changes and the accumulation (blocks 740, 750, 760) may occur in a single step.

It is recognized that the excitement update process illustrated in FIG. 7 may be implemented differently in other embodiments. For example, the excitement update process may be performed for the entire set of excitement values via parallel processing techniques. Also, the excitement update process may be combined with the prediction process illustrated in FIG. 6 rather than occurring as two separate processes. In addition, the excitement update process may execute locally for locally stored blocks and may execute on a remote system for remotely stored blocks. Moreover, the excitement update process may execute before or after the requested blocks have been returned.

Furthermore, it is recognized that the processes illustrated in FIGS. 4-7 are representative of one embodiment and that other embodiments may use a different number or manner of processes to carry out the excitement system and methods.

VII. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A system for improved access to a set of resources comprising:
    a processor configured to:
        access a set of resources, the set of resources comprising resource blocks;
        maintain a set of excitements, the set of excitements comprising excitement values that correspond to a plurality of the resource blocks;
        maintain a threshold;
        receive a request for a resource block;
        update the set of excitements, wherein a change in the excitement values is related to the requested resource block, and wherein the change in the excitement values comprises a convolution; and
        determine a set of predicted resource blocks by comparing the excitement values to the threshold.

2. A system for improved access to a set of resources comprising:
    a processor configured to:
        access a set of resources, the set of resources comprising resource blocks;
        maintain a set of excitements, the set of excitements comprising excitement values that correspond to a plurality of the resource blocks;
        maintain a threshold;
        receive a request for a resource block;
        update the set of excitements, wherein a change in the excitement values is related to the requested resource block, and wherein the change in excitement values comprises a function depending on an offset from the requested resource block; and
        determine a set of predicted resource blocks by comparing the excitement values to the threshold.

3. The system of claim 2, wherein the function enables just-in-time access to the set of predicted resource blocks.

4. The system of claim 2, wherein the function is at least one of inversely proportional to the offset over a range of offsets, substantially constant over a range of offsets, non-zero over a range of offsets, symmetric with respect to zero offset, zero for negative offsets, and less than or equal to zero for a first range of offsets and greater than or equal to zero for a second range of offsets.

5. A method of predicting future accesses to a resource, the method comprising:
    accessing a set of resources, the set of resources comprising resource blocks;
    maintaining a set of excitements, the set of excitements comprising excitement values that correspond to a plurality of the resource blocks;
    maintaining a threshold;
    receiving a request for a resource block;
    accessing the requested resource block;
    updating the set of excitements, further comprising calculating a change in the excitement values that is related to the requested resource block, wherein the step of calculating the change in the excitement values further comprises calculating an offset from the requested resource block;
    determining a set of predicted resource blocks, further comprising comparing the excitement values to the threshold;
    accessing the set of predicted resource blocks; and
    returning the requested and predicted resource blocks.

6. The method of claim 5, wherein the step of calculating an offset further comprises evaluating a function that is inversely proportional to the offset over a range of offsets or substantially constant over a range of offsets.

* * * * *

UNITED STATES PATENT AND TRADEMARK OFFICE
CERTIFICATE OF CORRECTION

PATENT NO. : 7,386,675 B2
APPLICATION NO. : 11/256317
DATED : June 10, 2008
INVENTOR(S) : Neal T. Fachan Page 1 of 1

It is certified that error appears in the above-identified patent and that said Letters Patent is hereby corrected as shown below:

In Column 11, Line 11, delete "variables" and insert -- variable x. --, therefor.

In Column 12, Line 62 (approx.), delete "$\Delta E(x)-$" and insert -- $\Delta E(x)=$ --, therefor.

In Column 13, Line 59, delete "$\Delta E(x)$" and insert -- $\Delta E(x)$. --, therefor.

In Column 18, Line 38, delete "$a\delta t - a\delta N/R$." and insert -- $a\delta t = a\delta N/R$. --, therefor.

Signed and Sealed this

Third Day of March, 2009

JOHN DOLL
*Acting Director of the United States Patent and Trademark Office*